United States Patent [19]

Lipman

[11] 4,204,264
[45] May 20, 1980

[54] HARMONIC CANCELLATION FOR MULTI-BRIDGE, THREE-PHASE CONVERTERS

[75] Inventor: Kenneth Lipman, West Hartford, Conn.

[73] Assignee: United Technologies Corporation, Hartford, Conn.

[21] Appl. No.: 964,305

[22] Filed: Nov. 27, 1978

[51] Int. Cl.² .............................................. H02M 1/12
[52] U.S. Cl. ........................................ 363/71; 363/40
[58] Field of Search ...................... 363/39, 40, 41, 71

[56] References Cited

U.S. PATENT DOCUMENTS

| | | | |
|---|---|---|---|
| 3,628,123 | 12/1971 | Rosa et al. | 363/43 |
| 3,792,286 | 2/1974 | Meier | 363/71 X |
| 3,876,923 | 4/1975 | Humphrey et al. | 363/71 |
| 3,979,662 | 9/1976 | Klein | 363/71 |
| 4,063,143 | 12/1977 | Forstbauer | 363/40 |

Primary Examiner—William M. Shoop
Attorney, Agent, or Firm—Dominic J. Chiantera

[57] ABSTRACT

All harmonics of an order less than (6·N−1) are cancelled from the fundamental signal presented in each output phase of a three-phase converter as the sum of corresponding phase angle fundamental signals from an N number of converter bridges, where N is a non-power of two.

4 Claims, 38 Drawing Figures

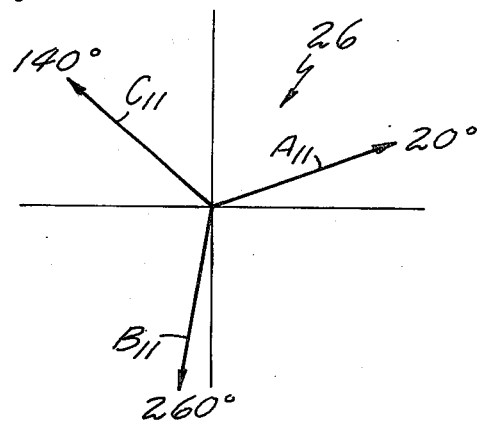
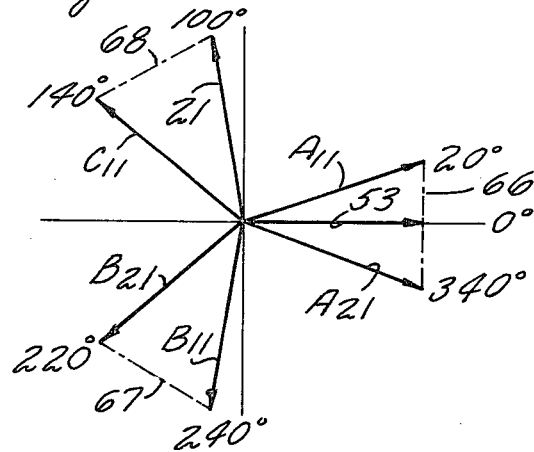
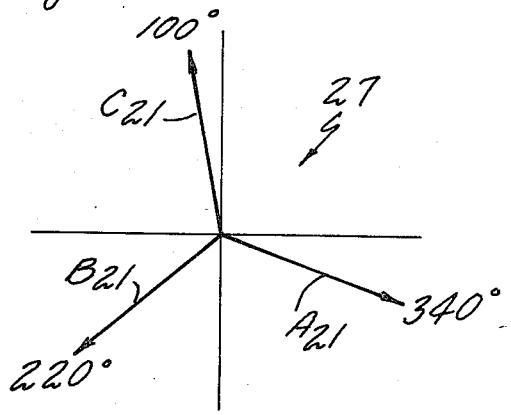
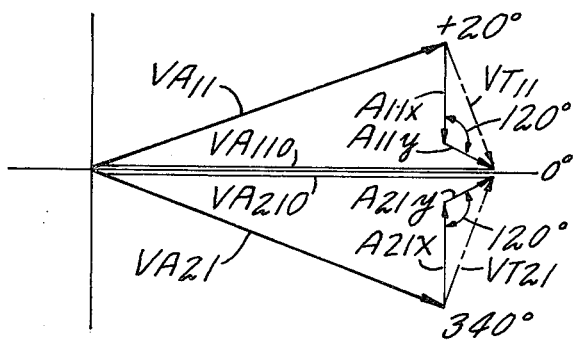
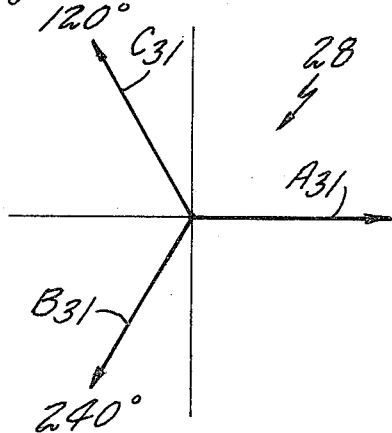
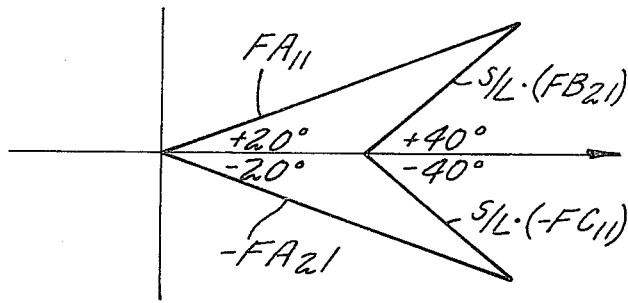

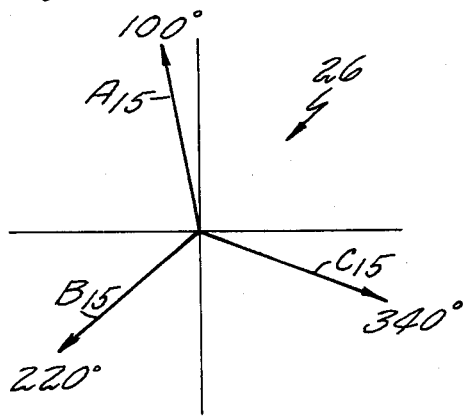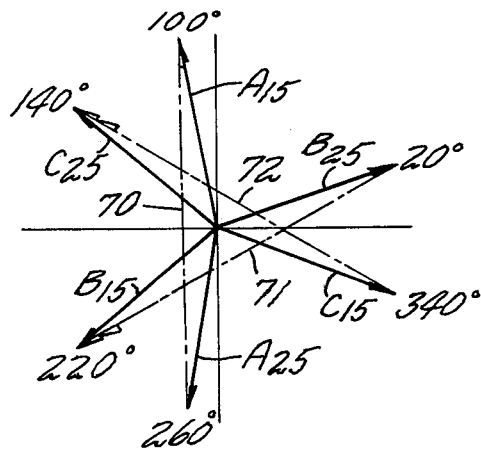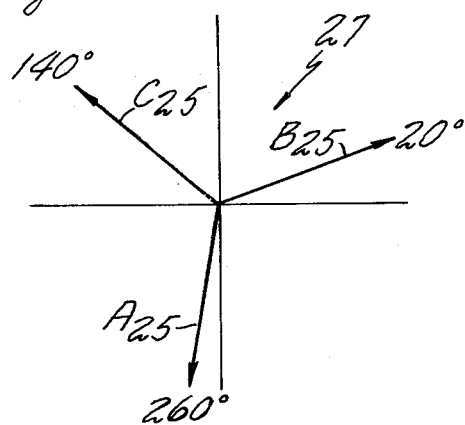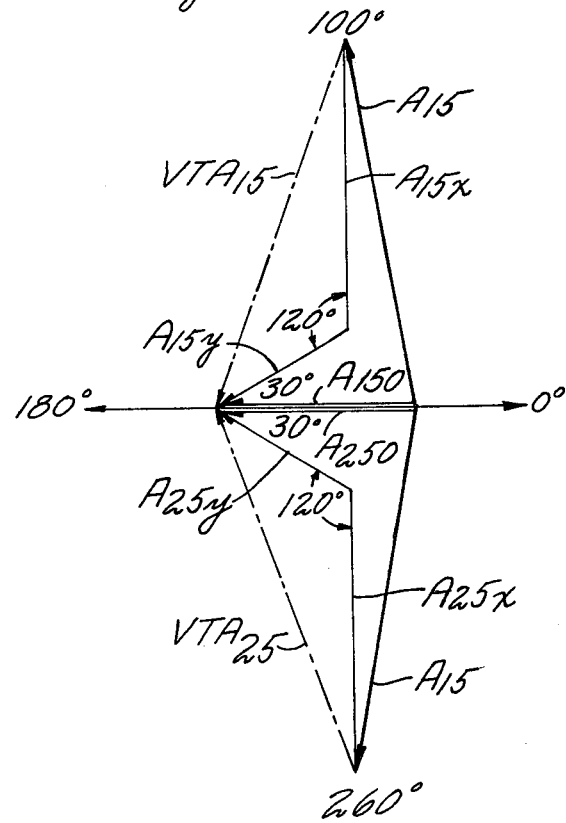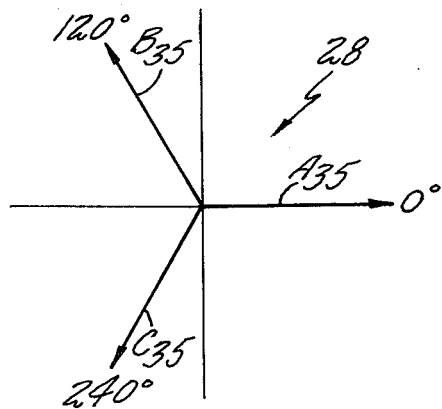

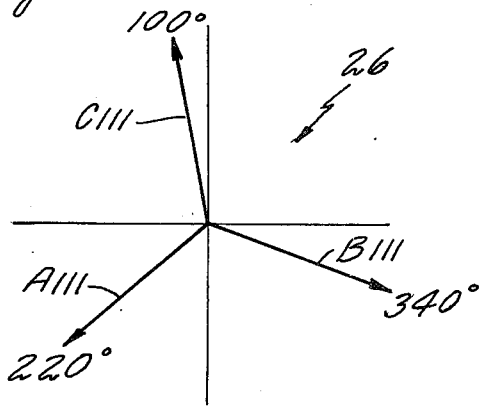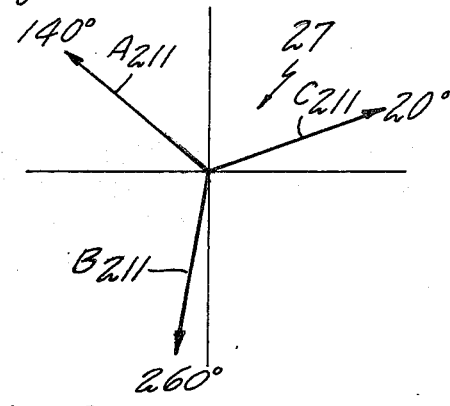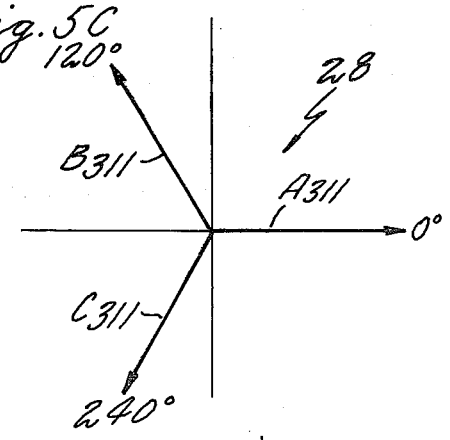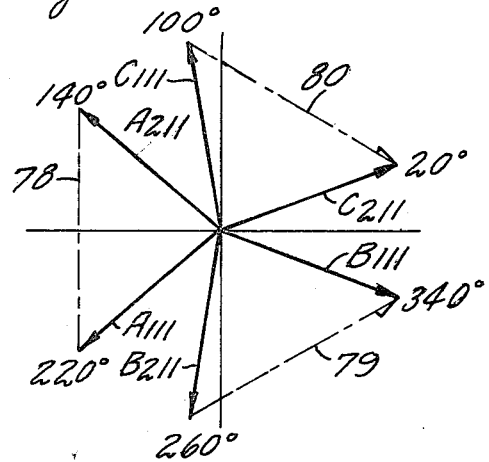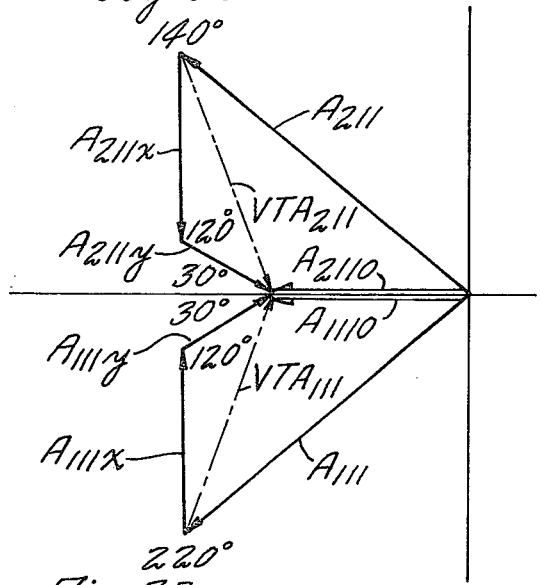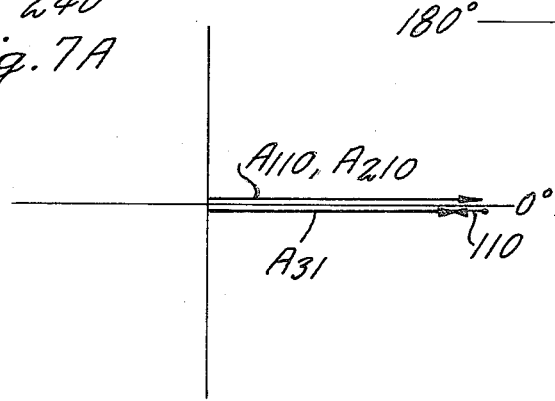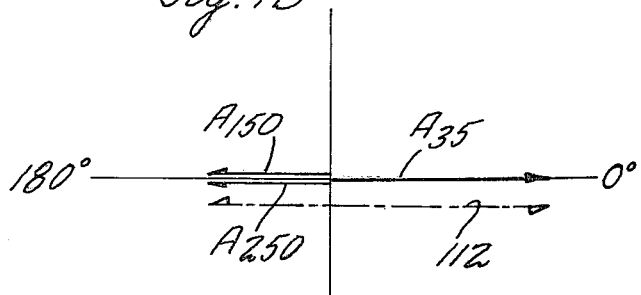

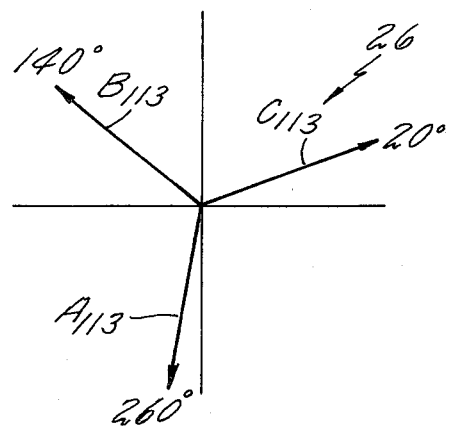
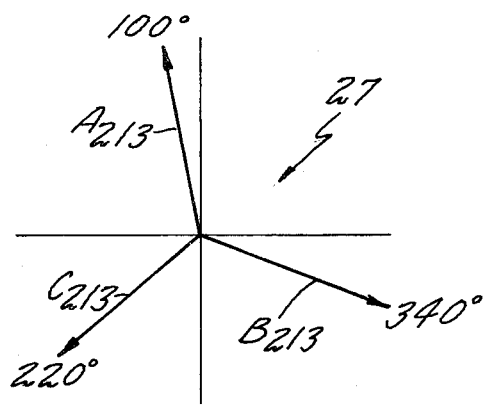
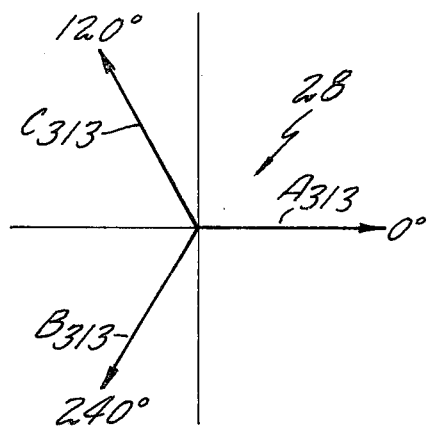
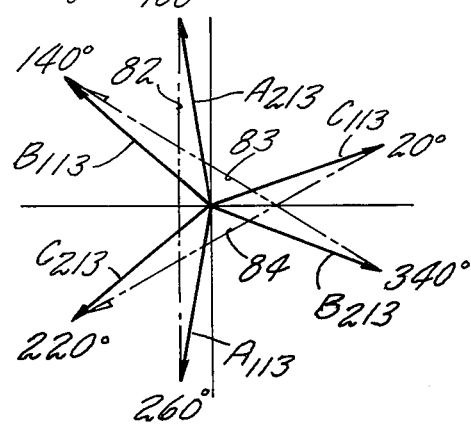
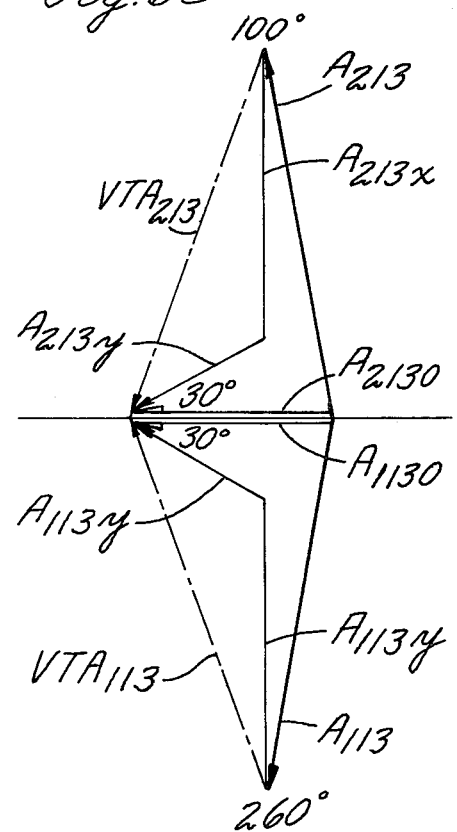

30-HARMONIC CANCELLATION CIRCUITRY

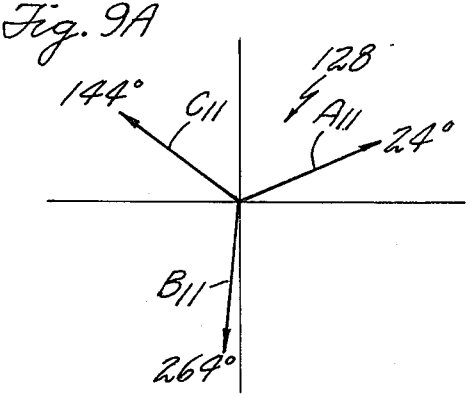
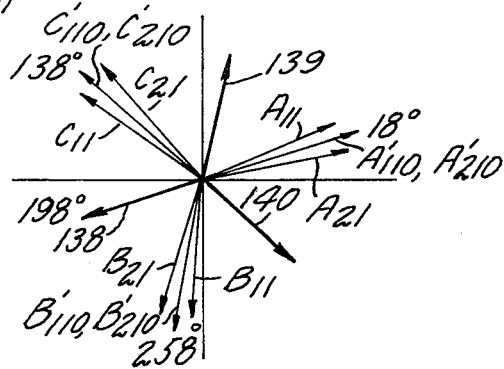
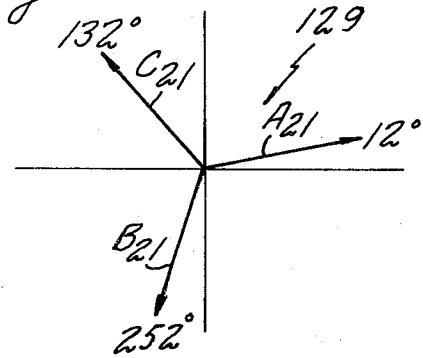
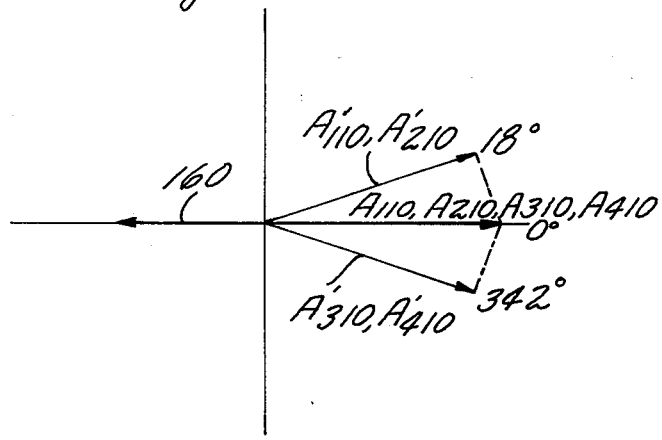
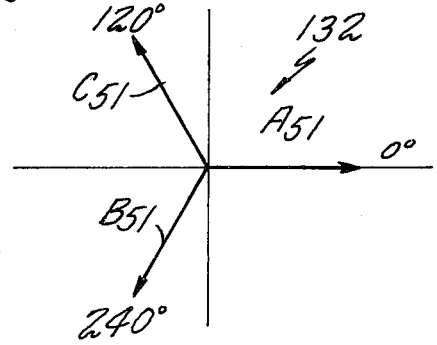
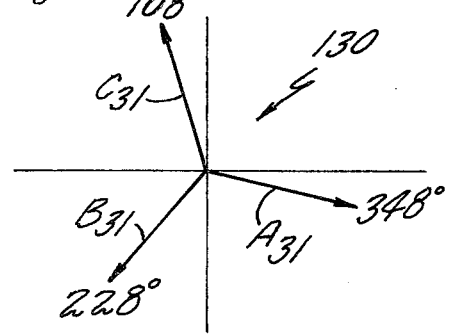
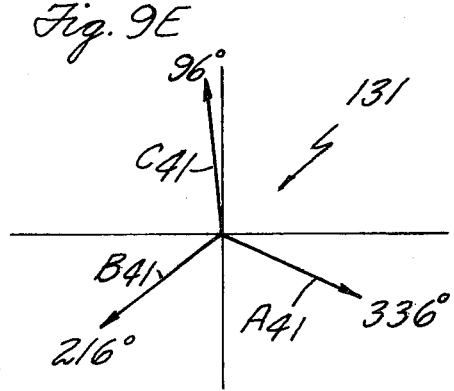

HARMONIC CANCELLATION FOR MULTI-BRIDGE, THREE-PHASE CONVERTERS

BACKGROUND OF THE INVENTION

1. Field of Invention

This invention relates to harmonic signal cancellation, and more particularly to harmonic signal cancellation in the output fundamental signals of a multi-bridge, three-phase power converter.

2. Description of the Prior Art

Present day three-phase converter systems provide for two way conversion of electrical energy, selectably, either from DC to AC or from AC back to DC, i.e. each converter functions alternately as an inverter (DC to AC) or a rectifier (AC to DC). As known, three-phase converters providing output power in excess of a few hundred kilowatts require the use of multiple converter bridges connected in parallel between the DC or AC sources and the load due to the limited power handling capability of individual bridges. When used as an inverter, each bridge provides at each of three-phase outputs, or poles, a square wave fundamental signal for each of the three output phases of the converter, each of which are filtered and summed with corresponding phase angle fundamentals from the other bridges in an output transformer to provide the output fundamental signal in each output phase of the converter. The square wave fundamental signals from each bridge have a harmonic content which causes the power level of the bridge fundamental signals to change each time a pole switches. These harmonics may be determined from the Fourier series expansion for a square wave fundamental signal of frequency $\omega t$ as:

$$f(t) = \frac{4 \cdot V}{\pi} \left[ \text{SIN}(\omega t + \phi) + \frac{1}{3}\text{SIN}(3\omega t + 3\phi) + \frac{1}{5}\text{SIN}(5\omega t + 5\phi) \ldots \frac{1}{\kappa}\text{SIN}(\kappa\omega + \kappa\phi) \right],$$

where V is the signal voltage magnitude and $\phi$ the phase angle. Only odd harmonics are present in the expansion, and for a square wave fundamental signal measured between the output holes of the three-phase system there is inherent cancellation of the third harmonics and multiples thereof, i.e. triplens, such that the signal harmonics of the fundamental signal between pole outputs are odd harmonics less triplens, i.e. the 5, 7, 11, 13, 17, 19, 23, 25, 29, 31, 35, 37 ... etc.

As known to those skilled in the art, if two signals (current or voltage) are added to each other at an angle $360°/2N = 180°/N$, the Nth harmonics of each signal are displaced from each other by $(180°/N)$. $N = 180°$ and will cancel if the amplitudes of each are equal. If pairs of signals are added from two sets of P phase signals this angle becomes $360°/2PN = 180°/PN$, or $60°/N$ for a three-phase system. This relationship is used in providing harmonic cancellation in a two-bridge three-phase inverter as disclosed by Udo H. Meier in U.S. Pat. No. 3,792,286, where various interconnection arrangements are illustrated for two phase displaced bridges driving two equally displaced load windings, to provide cancellation of the 5th and 7th harmonics of the output fundamental. In the Meier patent the corresponding phase outputs of the two bridges are relatively phase displaced by 30° ($360°/2PN$, where $P=3$, $N=2$) and the load windings are similarly displaced to provide a unity power factor fundamental signal to the load. Cancellation of the 5th and 7th harmonics occurs, in a three-phase reactor connected to the phase outputs of each bridge, as a direct result of the summation of two ($N=2$) sets of three ($P=3$) phase corresponding fundamental signals separated relatively displaced in phase by the angle $360/2PN = 30°$. Cancellation for only two bridges is disclosed and any attempt to extend the teaching of Meier to inverters having more than two bridges results in the realization that the number of bridges must be limited to powers of two to allow for successive addition of pairs, then pairs of pairs and so on. Therefore, the next number of bridges required is four, with the signals of the second pair summed in a second reactor which cancels the 5th and 7th harmonics of the second pair, and with the outputs from each of the two reactors being summed in a third reactor which provides cancellation of the next two sets of higher order harmonics 11, 13, 17 and 19. Since it may be found practical to provide high power converters with as many as seven inverter bridges, Meier fails to teach a method or apparatus for cancelling the fundamental harmonics in a three, five, six, or seven bridge converter system.

A second U.S. Pat. No. 3,876,923, to A. J. Humphrey et al provides an extension of the Meier teaching by disclosing the use of the Meier arrangement for a two inverter bridge system relatively displaced at the interpole angle of 30° and providing three-phase power through a similar reactor into a phase displaced load winding, which in Humphrey et al is disclosed as a combination of phase and auxiliary windings in a common magnetic circuit as opposed to the electrically isolated loads of Meier. As in Meier, there is no suggestion by Humphrey et al of a method or arrangement for cancelling the fundamental harmonics in an inverter system having non-power of two numbers of bridges.

SUMMARY OF THE INVENTION

The object of the present invention is to provide harmonic signal cancellation in the output fundamental signals of a multi-bridge, three-phase converter, each output fundamental signal being equal to the sum of corresponding phase angle fundamental signals provided from three sets of corresponding phase outputs of an N number of converter bridges, where N is a non-power of two, the phase outputs of the bridges providing the associated fundamental signal at a phase angle determined by a phased gate signal provided from a gate signal source.

In accordance with the present invention, a harmonic cancellation method includes the steps of adjusting the phase angle of the fundamental signals at the phase outputs of the bridges to provide a phase displacement of the fundamental signals of each bridge by 60/N degrees relative to the corresponding phase output fundamental signals of at least one other bridge, grouping the bridges in first and second groups where the first group includes the highest power of two number of bridges in the N bridges present and the second group includes all of the remaining bridges, resolving the corresponding phase displaced fundamental signals of the first group in successive levels of increasing numbers of pairs, beginning with a first level for a single pair through a highest level for the highest number of pairs available from the power of two number of bridges, resolution at each level providing an intermediate fundamental signal having a phase angle equal to the mean phase angle of the cumulative corresponding phase fundamental signals resolved at that level, the highest level providing a resultant first group fundamental signal for each set of corresponding phase outputs of the first group, each having a phase angle equal to one of the output phases of the converter, similarly resolving the corresponding phase displaced fundamental signals of the second group in levels if more than one bridge is present in the second group to provide a resultant second group fundamental signal for each corresponding phase output, and if only a single bridge is present using the phase output fundamental signals of the single bridge to represent the resultant second group fundamental, each resultant second group fundamental signal having a phase angle equal to that of a corresponding phase first group fundamental signal and each having all harmonics of an order less than (6·N−1) one hundred eighty degrees out of phase with the equal order harmonics of the corresponding phase first group fundamental, and summing each first group fundamental signal with the corresponding phase second group fundamental signal to provide a sum fundamental signal for each of the N sets of corresponding phase outputs, each sum fundamental signal having a first harmonic of order (6·N−1) and each presented as the output fundamental signal in one of the output phases of the converter. In further accord with the present invention, adjusting the phase angle of the fundamental signals includes symmetrically phase displacing the corresponding phase outputs of the N bridges such that even numbers are displaced positively and negatively from the associated one of the converter output phases, each relatively displaced by 60/N degrees from adjacently displaced corresponding phase outputs, to provide an array extending from an innermost pair of corresponding phase outputs to an outermost pair, the second group of bridges having phase outputs most closely related to the innermost pair of corresponding phase outputs.

In still further accord with the present invention, apparatus for providing harmonic cancellation in a three-phase converter having the N number of converter bridges includes apparatus for adjusting the phased gate signals from the gate signal source to provide phase displacement of the fundamental signals of each bridge by 60/N degrees relative to the fundamental signals provided at corresponding phase outputs of at least one other bridge, first and second phase shifting transformers each responsive to the displaced fundamental signals from a first group and a second group of bridges respectively, the first group including the highest power of two number of bridges, each phase shifting transformer adding each displaced fundamental signal in the related first and second group to the difference signal magnitude between the particular fundamental signal and the displaced fundamental signals from corresponding phase outputs in the related group and to the difference signal magnitude between displaced fundamental signals of at least one other set of corresponding phase outputs of the related group, to provide a first group fundamental signal for each displaced fundamental signal in the first group and a second group fundamental signal for each displaced fundamental signal in the second group, each having a phase angle corresponding to one of the converter phases, the second group fundamental signals having all signal harmonics of an order less than (6·N−1) displaced by one hundred eighty degrees from the equal order signal harmonics of the corresponding phase first group fundamental signal, and a summing transformer responsive to the first and second group fundamental signals for summing those having corresponding phase angles to provide the output fundamental signal in each of the three converter phases, each output fundamental signal having a first harmonic of order (6·N−1).

These and other objects, features and advantages of the present invention will become more apparent in light of the following detailed description of a preferred embodiment thereof, as illustrated in the accompanying drawing.

BRIEF DESCRIPTION OF THE DRAWING

FIGS. 2A–2F are vector illustrations of the fundamental signal waveforms used in the description of the embodiment of FIG. 1;

FIGS. 3A–3E are vector illustrations of the 5th harmonic signals of the fundamental signals of FIGS. 2A–2F used in the description of the embodiment of FIG. 1;

FIGS. 5A–5E are vector illustrations of the 11th harmonic signals of the fundamental signals of FIGS. 2A–2F used in the description of the embodiment of FIG. 1;

FIGS. 6A–6E are vector illustrations of the 13th harmonic signals of the fundamental signals of FIGS. 2A–2F used in the description of the embodiment of FIG. 1;

FIGS. 7A and 7B are vector illustrations of selected operating waveforms of the embodiment of FIG. 1;

FIGS. 9A–9G are vector illustrations of the fundamental signals and operating waveforms of the embodiment of FIG. 8.

DETAILED DESCRIPTION

Figure 1:
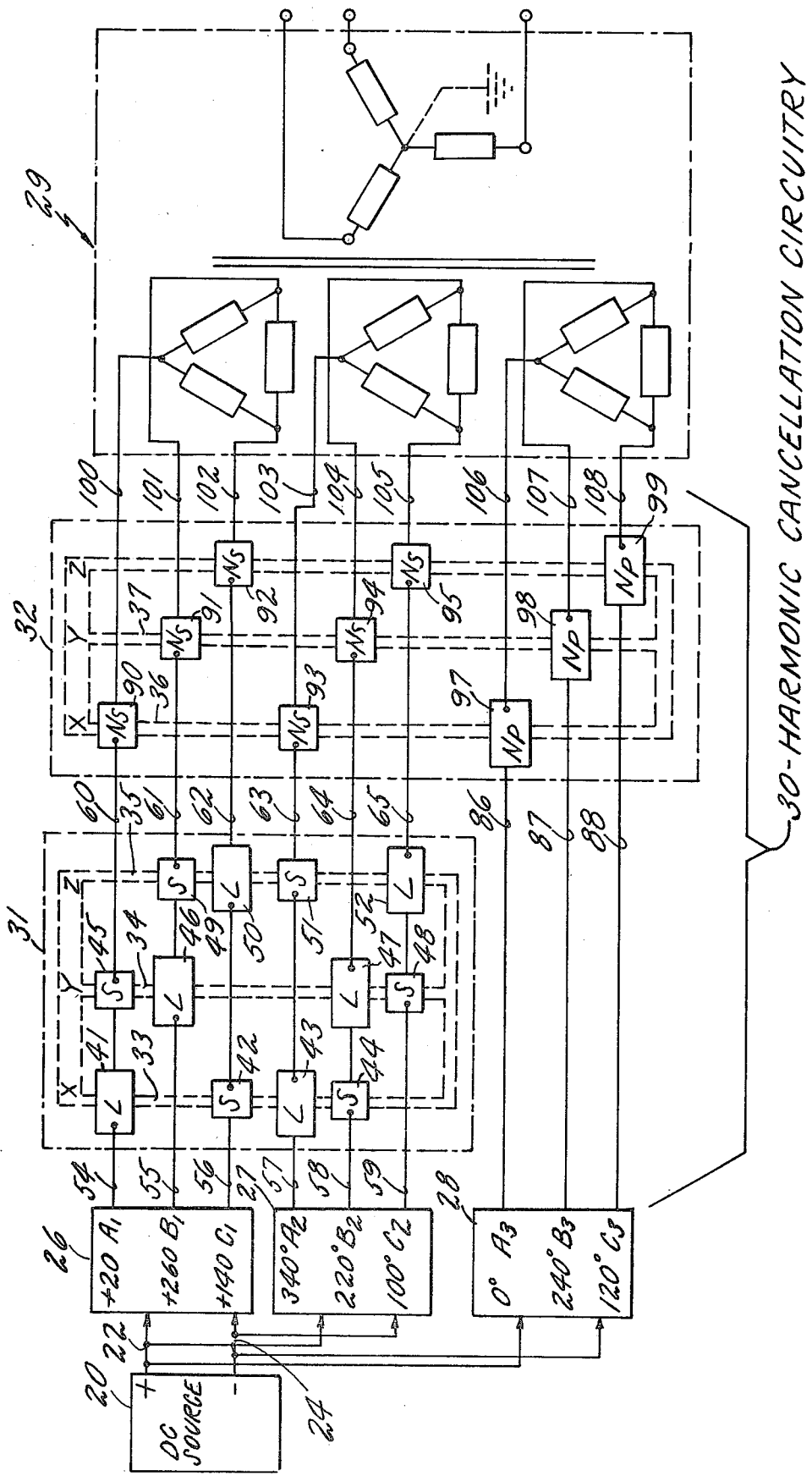
FIG. 1 is a schematic block diagram illustration of one embodiment of harmonic cancellation apparatus according to the present invention for use with a three-phase, three-bridge converter.

Referring now to FIG. 1, in an embodiment of harmonic frequency cancellation apparatus according to the present invention for a three-phase, three-bridge (N=3) converter providing DC to AC conversion, i.e. inverter function, the converter 18 receives DC electrical power from a DC voltage source 20 connected positively and negatively through lines 22, 24 to inputs of three parallel converter bridges 26–28. Each bridge has three-phase outputs, or pole outputs, A, B and C, relatively phase displaced in a closed sequence by 120° (360°/P), each at a phase angle corresponding to one of the three converter output phases. In the absence of harmonic cancellation the bridge phase outputs are presented directly to associated phases of an output transformer 29, such as a delta-wye type which provides a summation of each three fundamental signals of the corresponding phase outputs of the bridges to provide a sum fundamental signal as the output signal in each converter phase. Each sum fundamental signal has a voltage magnitude equal to that of the fundamental at the bridge phase outputs and a current magnitude three times that at the individual phase outputs. In the present invention, harmonic cancellation circuitry 30 is interconnected between the bridge phase outputs and the transformer 29 to provide the harmonic signal cancellation prior to signal transfer through the output transformer.

Figure 10:
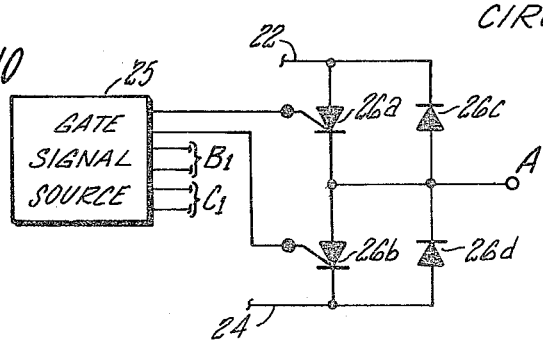
FIG. 10 is a partial schematic diagram of a converter bridge phase output, used in the description of the embodiments of FIGS. 1 and 5.

The converter bridges 26-28 are of a type known in the art which includes voltage control switches, such as thyristors, for each of the three-phase outputs. Referring to FIG. 10, in a partial illustration of the bridge 26 the A phase output includes thyristors 26a, 26b connected between the A output and the lines 22, 24 respectively. The thyristors are actuated by phased gate signals from an adjustable gate signal source 25 which provides phased gate signals displaced from each other by 120° to the phase outputs of each bridge to establish the relative phase angle of the phase outputs. Each thyristor is actuated, alternately, to connect the A output to the positive and negative bus lines 22, 24, thereby providing an alternating voltage and current signal at the fundamental frequency and desired phase angle. Each thyristor is shunted by an antiparallel diode, such as the diodes 26c, 26d, which suppress transient voltage signals associated with switching the thyristors, by providing a reverse current path around the thyristor. These diodes are commonly referred to as quenching diodes and their function is well known in the art. In addition, the diodes provide for rectification of AC signals appearing at the A terminal to provide a DC signal output to the lines 22, 24 when the converter 18 is used as a rectifier. In this case, the DC source 20 becomes a DC load and the converter output transformer 29 becomes an input transformer to distribute an incoming three-phase AC signal to each of the three bridges 26-28.

In the present embodiment, the bridge output signals are not pulse modulated, such that the phase output fundamental signals are substantially square waves. This provides a simplification of the description and analysis of the harmonic cancellation of the present invention, but in no way limits the invention to inverters providing only square wave pole output signals. As known, pulse modulation is used to reduce harmonics of the fundamental as well as to provide for voltage regulation and may be used in combination with the harmonic cancellation of the present invention if desired.

Referring again to FIG. 1, the corresponding phase outputs ($A_1$, $A_2$, $A_3$ and $B_1$, $B_2$, $B_3$ etc.) are phase displaced to provide a relative phase displacement of $\theta = 360°/2PN = 20°$, by shifting the thyristor gate signals. The phased gate signals to all of the bridges may be shifted to provide an absolute phase shift of all of phase outputs in any direction deemed suitable for the particular converter application, such as providing three-phase AC power into a phase shifted load as in Meier, however, the phase output fundamental signals from each bridge must be relatively phase displaced by 60/N degrees from the corresponding phase output fundamental signal in at least one other bridge. In a preferred embodiment for a converter providing three-phase AC to a nondisplaced load, the power of two number of bridges (two in FIG. 1) are phase shifted plus and minus 20° about the phase angle of the corresponding phase outputs of the present odd bridges. This provides for the alternate positive and negative phase shifting of the two bridges 26, 27 symmetrically about the nondisplaced odd bridge 28. Since, as described in detail hereinafter, the displaced fundamental signals are all resolved into a sum fundamental signal at a phase angle equal to the mean value of the phase angles of the displaced fundamental signals, the symmetrical displacement of bridges 26, 27 about bridge 28 results in a 0° phase angle equal to that provided in one of the three phases of the converter prior to phase displacement of the bridges. The displacement is illustrated by vector representation of the fundamental signals for each bridge in FIG. 2A-2C. In FIGS. 2A-2C, and in the remaining Figures of the drawing, the phase output fundamental signals are illustrated by vectors identified by a letter corresponding to the related phase output (A, B, C) and by a subscript with a first digit identifying the particular one of the three inverter bridges (subscripts 1-3 correspond to bridges 26-28) and a second set of digits identifying the harmonic signal from the fundamental, or first harmonic (1) up to the thirteenth harmonic (13). In FIGS. 2A-2C, the fundamental signal from the corresponding phase outputs A of the bridges 26-28 are identified as $\vec{A}_{11}$, $\vec{A}_{21}$, and $\vec{A}_{31}$, respectively.

The phase outputs of the three bridges 26-28 are connected to the harmonic cancellation circuitry 30 which includes phase shifting transformers 31, 32, each having a three-phase core of X, Y and Z legs, 33-35 and 36-38 respectively, each phase displaced from the other in a closed sequence by 120°. The phase shifting transformer 31 includes a set of four windings 41-44, 45-48, and 49-51 on each of the three core legs 32-34, each set including a pair of long (L) and a pair of short (S) windings at a turns ratio S/L. The L and S windings in each set are electrically connected in series opposing with an opposite type (S or L) winding in one of the other sets, providing between the transformer input and output lines 54-59 and 60-65, series opposing L and S windings on two different legs of the transformer, as illustrated generally in FIG. 1. The transformer 31 is substantially similar to the reactor disclosed by Meier in the hereinbefore referenced U.S. Pat. No. 3,792,286 patent and, as generally described, the individual L and S windings of each set are connected to selected phase outputs from each of the pair of bridges 26, 27 to provide a zero fundamental signal ampere turns (F) within the transformer three-phase core.

In FIG. 1, the phase outputs of the bridges 26, 27 are connected through the lines 54-59 to selected windings on each of two legs of the transformer 31 as illustrated. The S/L turns ratio is calculated to provide zero ampere turns in the transformer core for the displaced fundamental signals, such that the leg 32 has L windings 41, 43 connected through lines 54, 57 to the corresponding phase outputs $A_1$, $A_2$ and S windings 42, 44 connected through lines 56, 58 to phase outputs $C_1$, $B_2$. Referring to FIG. 2F, the ampere turns (F) produced by the $A_{11}$ fundamental signal is illustrated as a vector $F\vec{A}_{11}$ at $+20°$, the ampere turns of the $A_{21}$ output as a vector $-F\vec{A}_{21}$ (opposite phasing of windings 41, 43) at $-20°$, the $C_{11}$ ampere turns as S/L. $(-F\vec{C}_{11})$ (opposite phasing of windings 41, 42), and the $B_{11}$ ampere turns as the vector S/L $F\vec{B}_{21}$. Therefore, from FIG. 2F:

$S/L = F\vec{A}_{11}/F\vec{B}_{21} \cdot SIN\ 20°/SIN\ 40°$. Since the
fundamental signal magnitudes are equal,
$F\vec{A}_{11} = F\vec{B}_{21}$, and $S/L = SIN\ 20°/SIN$
$40° = 0.5321$.

FIG. 2D illustrates the displaced fundamental signals presented through the lines 54–59 to the transformer 31, each with a power factor of Cos 20°. The kilowatt (Kω) current ($I_o$) and voltage ($V_o$) of each is equal to I·Cos 20° and V·Cos 20°, where I and V are the current and voltage magnitudes for a nondisplaced fundamental as illustrated generally by the vector 53. To maintain Kω power at the level prior to displacement, the voltage magnitude $V_o$ is increased in the transformer 31 by the reciprocal of the power factor, or $V_o = V \cdot (1/\text{Cos } 20°)$. The increase (1.0642V/V) results from the addition of the displaced phase output fundamental with the voltages developed in each of the series L and S windings connected to the phase output, such that the fundamental signal from $A_1$ is added to the voltage developed across each of the series L and S windings 41, 45, and the signal from $A_2$ is added to the voltage developed across the windings 43, 51. The voltages developed in these series windings represent the fundamental signal voltage drop across the leg associated with the winding resulting from the difference voltage magnitude between each of two pairs of displaced corresponding phase output fundamental signals. In FIG. 2D the difference voltage signal magnitude across the legs 32–36 resulting from the displaced corresponding phases ($A_{11}$–$A_{21}$, $B_{11}$–$B_{21}$, and $C_{11}$–$C_{21}$) are illustrated in phantom by the vectors 66–68. The addition of each pole output fundamental voltage signal with the difference magnitude between two pairs of corresponding phase outputs, one pair of which includes the phase output providing the fundamental signal, results in a first level fundamental signal at the output of the transformer 31 on the lines 60–65 for each pole fundamental signal on the input lines 54–59. Referring to FIG. 2E, for the outputs $A_1$, $A_2$ the displaced fundamental voltage signals $\vec{VA}_{11}$, $\vec{VA}_{21}$ are added to the total voltage developed across the two pairs of series windings, $\vec{VT}_{11}$ and $\vec{VT}_{21}$ respectively. The voltage $\vec{VT}_{11}$ is the sum of the voltages across windings 41, 45, illustrated by vectors $\vec{a}_{11x}$, $\vec{a}_{11y}$ relatively phase displaced by 120° equal to the displacement between the legs of the transformer core. The magnitudes of $\vec{a}_{11x}$ and $\vec{a}_{11y}$ are proportional to the difference signal magnitude of the displaced fundamental voltage signals $\vec{A}_{21}$–$\vec{A}_{11}$ and $\vec{B}_{11}$–$\vec{B}_{21}$ respectively (FIG. 2D, difference vectors 66, 67). Since the fundamental voltage magnitudes at the pole outputs are equal and the angle between displaced corresponding phase output signals is equal (twice the interpole angle, or 40°) the voltages developed in each of the windings 45, 51 are related by the turns ratio, or: $\vec{a}_{11y}/\vec{a}_{11x} = S/L = 0.5321$. The same result is obtained for the voltage signal $\vec{VT}_{21}$ which is the sum of the voltage developed across the series L and S windings 43, 51, or $\vec{a}_{21x}$ and $\vec{a}_{21y}$, each equal to the fundamental voltage difference between displaced corresponding outputs $\vec{A}_{11}$–$\vec{A}_{21}$ and $\vec{C}_{21}$–$\vec{C}_{11}$ (vectors 66, 68 of FIG. 2D). As a result of the addition, first level fundamental signals $\vec{VA}_{110}$, $\vec{VA}_{210}$ are provided on the lines 60, 63, each at a voltage $V_o = V \cdot (1/\text{Cos } 20°)$ and a current I·Cos 20°. The output Kω power of each is VI. The remaining phase outputs of the bridges 26, 27 are treated in an identical manner, each added to the voltages developed in the series windings associated with each to provide first level fundamental signals having identical current and voltage magnitudes on the remaining lines 61, 62, 64 and 65.

The phase shifting transformer 31 modifies the 5, 7, 11 and 13th harmonics of the fundamental signals in the same manner as the fundamental itself, by adding to each phase displaced harmonic signal at the bridge phase output the harmonic voltages developed across each of the series windings connected to the phase outputs. Referring now to FIGS. 3A–3C, the 5th harmonic signals for the bridges 26, 27 and 28 are each at a phase angle five times greater than the phase angle of the associated fundamental. Considering the 5th harmonic signals $\vec{A}_{15}$, $\vec{A}_{25}$ and $\vec{A}_{35}$ for the corresponding pole outputs $A_1$, $A_2$, $A_3$. The phase angle of the $A_3$ pole is zero and so is the 5th harmonic $\vec{A}_{35}$, whereas the 5th harmonics $\vec{A}_{15}$ and $\vec{A}_{25}$ are at 100° and 260° respectively. FIG. 3D illustrates the 5th harmonic signals presented to the transformer 31 on lines 54–59. As with the fundamentals the 5th harmonic signal magnitudes $\vec{A}_{150}$ and $\vec{A}_{250}$ at the output of the transformer, on the lines 60, 63, is equal to the sum of the $\vec{A}_{15}$, $\vec{A}_{25}$ signal magnitudes and the voltages across the series L and S windings 41, 45 and 43, 51. Again each winding voltage is proportional to the 5th harmonic voltage difference across that leg of the transformer core associated with the particular winding. In FIG. 3D the vectors 70–72, shown in phantom, illustrate the voltage differences between the 5th harmonic signals. Referring to FIG. 3E the voltages across the windings 41, 45 (vectors $\vec{a}_{15x}$ and $\vec{a}_{15y}$) are equal to the difference signal magnitudes of the 5th harmonic of two pairs of displaced corresponding phases, $\vec{A}_{25}$–$\vec{A}_{15}$ and $\vec{B}_{15}$–$\vec{B}_{25}$ and the voltages across windings 43, 51 (vectors $\vec{a}_{25x}$ and $\vec{a}_{25y}$) are equal to the voltage differences $\vec{A}_{15}$–$\vec{A}_{25}$ and $\vec{C}_{25}$–$\vec{C}_{15}$. With the ratio $\vec{a}_{11y}/\vec{a}_{11x} = S/L = 0.5321$ and the relative phase displacement of 120° between the winding voltages, the first level fundamental signal 5th harmonics on the lines 60, 63 are equal to the sum of the vectors $\vec{A}_{15} + \vec{a}_{15x} + \vec{a}_{15y}$ and $\vec{A}_{25} + \vec{a}_{25x} + \vec{a}_{25y}$, illustrated as 5th harmonic vectors $\vec{A}_{150}$, $\vec{A}_{250}$ at signal magnitudes equal to 0.5321 times that of the phase output fundamental harmonics $\vec{A}_{15}$, $\vec{A}_{25}$, and rotated by 180° from the 5th harmonic signal $\vec{A}_{350}$ of the nondisplaced bridge 28. The magnitude of the vector $\vec{A}_{150}$ is:

$$|\vec{A}_{150}| = |\vec{A}_{15}| \left[ \text{Cos}(180° - \phi_{15}) + \frac{S/L \; \text{SIN} \, (180° - \phi_{15})}{1 + S/L \; \text{SIN} \, 30°} \right];$$

where $\phi_{15} = 100°$ (phase angle of the displaced 5th harmonic $\vec{A}_{15}$), such that $$|\vec{A}_{150}| = 0.5321 |\vec{A}_{15}| = (S/L) \cdot |\vec{A}_{15}|.$$

The magnitude of $\vec{A}_{250}$ is calculated in an identical manner using $\phi_{25} = 260°$ and the 5th harmonic magnitude $\vec{A}_{25}$. The 5th harmonics of the fundamentals of the remaining phase outputs $B_1$, $B_2$, $C_1$, $C_2$ are treated in the same manner, such that the first level fundamental signal 5th harmonic for $B_1$, i.e. $\vec{B}_{150} = S/L \; \vec{B}_{15}$ at a phase angle of 300° which is displaced by 180° from the 5th harmonic $\vec{B}_{35}$ (at a phase angle 120°, FIG. 3C) of the nondisplaced bridge 28.

Figure 4A:
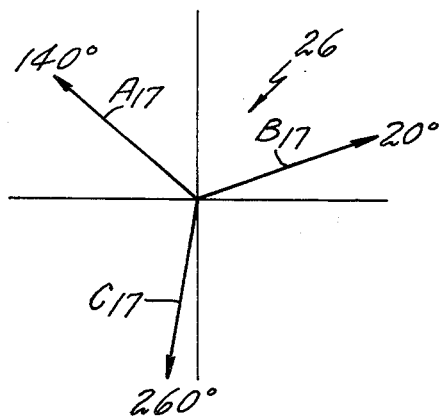
FIGS. 4A–4E are vector illustrations of the 7th harmonic signals of the fundamental signals of FIGS. 2A–2F used in the description of the embodiment of FIG. 1.
Figure 4B:
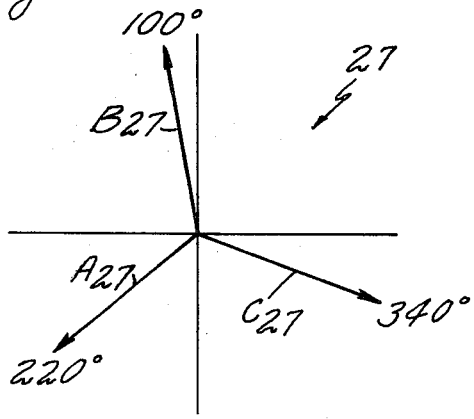
Figure 4C:
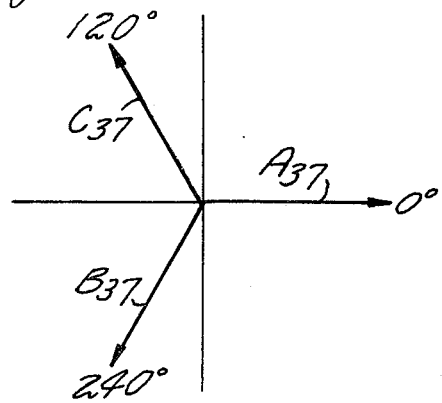
Figure 4D:
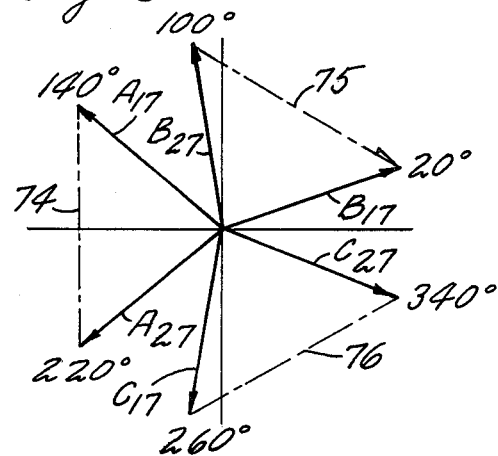
Figure 4E:
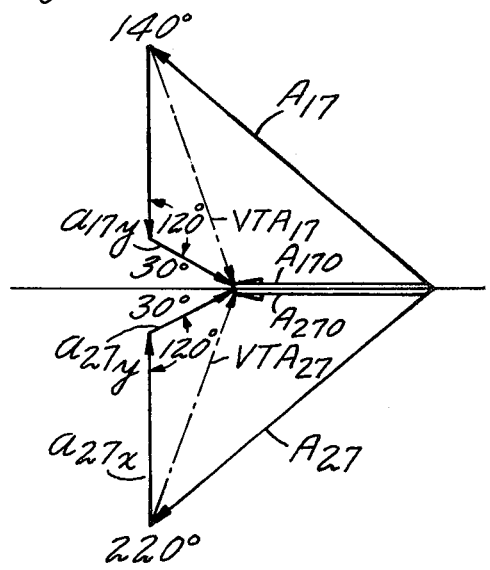

FIGS. 4A–4C illustrate vectorially the 7th harmonic signals of the fundamentals at the phase outputs of the bridges. FIG. 4D illustrates the 7th harmonic signals presented to the transformer 31 and the voltage difference between the 7th harmonics of the A, B, C outputs, illustrated in phantom by vectors 74–76. Considering again the $A_1$, $A_2$ corresponding phases, the 7th harmonic output signals from the transformer 31 on the lines 60, 63 is illustrated in FIG. 4E by vectors $\vec{A}_{170}$, $\vec{A}_{270}$, each equal to the sum of the phase output 7th harmonic signal and the voltages across the series L and S windings (41, 45 and 43, 51), illustrated vectorially as: $\vec{A}_{170}=\vec{A}_{17}+\vec{A}_{x17}+\vec{A}_{y17}$ and $\vec{A}_{270}=\vec{A}_{27}+\vec{A}_{x27}+\vec{A}_{y27}$. The first level fundamental signal 7th harmonics are equal in magnitude. For harmonic $\vec{A}_{170}$:

$$|\vec{A}_{170}| = |\vec{A}_{17}| \left[ \cos(180° - \phi_{17}) + \frac{S/L \sin(180° - \phi_{17})}{1 + S/L \sin 30°} \right];$$

where $\phi_{17}=140°$, so that $|\vec{A}_{170}|=0.5321\ |\vec{A}_{17}|$. The same result is obtained for the harmonic $\vec{A}_{270}$. Therefore, the 7th harmonic signal at the output of the transformer is also at a magnitude equal to the turns ratio (S/L) times the harmonic signal magnitude of the pole fundamental signal and is phase displaced by 180° from the 7th harmonic $\vec{A}_{37}$ of the nondisplaced bridge 28. Each other phase output 7th harmonic is similarly scaled and phase shifted.

The 11th and 13th harmonics of the fundamental signal at the pole outputs are treated in an identical manner. The 11th harmonics at the pole outputs are illustrated in FIGS. 5A-5C. FIG. 5D illustrates the 11th harmonic signals presented to the transformer with the 11th harmonic voltage differences between the corresponding pole outputs across the transformer core shown in phantom by the voltage difference vectors 78-80. In FIG. 5E, the summation of the corresponding phase A output 11th harmonic signals $\vec{A}_{111}$ and $\vec{A}_{211}$ with the voltage developed across the series windings 41, 45 and 43, 51 provide equal magnitude output 11th harmonic components $\vec{A}_{1110}$, $\vec{A}_{2110}$ on the lines 60, 63, each equal to:

$$\vec{A}_{1110} = \vec{A}_{111} \left[ \cos 180 - \theta_{11} - \frac{\frac{S}{L} \sin 180 - \theta_{11}}{1 + \frac{S}{L} \sin 30°} \right];$$

where $\theta_{11}=140°$, or $\vec{A}_{1110}=0.5321\ \vec{A}_{111}=(S/L)\ \vec{A}_{111}$. Similarly, the 13th harmonic signals at the pole outputs are illustrated in FIGS. 6A-6C, and FIG. 6D illustrates the 13th harmonic signals presented through lines 54-59 to the transformer, with the voltage differences between the 13th harmonics of corresponding A, B and C phase outputs illustrated in phantom by the vectors 82-84. FIG. 6E illustrates the resultant first level fundamental signal 13th harmonic for the corresponding $A_1$, $A_2$ phase outputs which appear on lines 60, 63 as $\vec{A}_{1130}=0.5321\ \vec{A}_{113}$ and $\vec{A}_{2130}=0.5321\ \vec{A}_{213}$.

Referring again to FIG. 1, the first level fundamental signals on lines 60-65 are presented to the cancellation transformer 32 together with the fundamental signals on lines 86-88 from the outputs of the nondisplaced bridge 28. The transformer 32 includes secondary windings 90-95 and primary windings 97-99. Two secondary windings and one primary winding are disposed on each of the three legs 36-38 of the transformer core. Each first level fundamental signal passes through one of the secondary windings 90-95, and each of the corresponding phase first level signals pass through secondary windings on the same leg of the core, such that corresponding A phase first level signals on lines 60, 63 pass through secondary windings 90, 93 on legs 36, corresponding B phase first level signals on lines 61, 64 pass through secondary windings 91, 94 on leg 37, and corresponding C phase first level signals pass through secondary windings 92, 95 on leg 38. The fundamental signals of the nondisplaced bridge 28 on lines 86-88 each pass through a primary winding on the core leg associated with the corresponding phase first level fundamental signals from the bridges 26, 27. The secondary windings ($N_S$) on each leg are in phase with each other and 180° out of phase with the primary winding ($N_P$) on the same leg.

The turns ratio of the $N_P$, $N_S$ windings is similarly calculated to provide for a zero ampere turns (F) of the fundamental signal in the transformer core. The ampere turns is proportional to the turns of the associated winding:

$$N_S \cdot I_{A10} + N_S \cdot I_{A20} + N_P \cdot I_{A3} = 0.$$

Since $I_{A3}=I_{A1}=I_{A2}=I$ and $I_{A10}=I_{A20}=I \cdot \cos 20°$, then:

$$N_S/N_P = 1/2 \cos 20° = 0.5321\ V/V.$$

The turns ratio $N_S/N_P$ is identical to the ratio (S/L) of the transformer 31 for the N=3 bridge converter.

In the transformer 32 the signals on the input lines 60-65 and 86-88 are summed with the voltage developed across the associated secondary or primary windings. As in the transformer 31 the voltage developed in these windings is proportional to the difference signal magnitude between the corresponding phase fundamental signals on the same leg of the core.

Considering the corresponding A phase output signals FIG. 7A illustrates the first level fundamental signals $\vec{A}_{110}$ and $\vec{A}_{210}$ on lines 60, 63 at a phase angle of zero degrees, equal to that of the fundamental signal $\vec{A}_{31}$ on the line 86. The voltage magnitude of the first level fundamental signals are:

$$\vec{A}_{110} = \vec{A}_{11} \cdot \frac{1}{\cos 20°}, \vec{A}_{210} = \vec{A}_{21} \cdot \frac{1}{\cos 20°}.$$

The fundamental signal magnitudes are equal at the bridge outputs, ($\vec{A}_{11}=\vec{A}_{21}=\vec{A}_{31}=\vec{A}$) such that $\vec{A}_{110}=\vec{A}_{210}=1.064 \cdot \vec{A}$ and $\vec{A}_{1110}-\vec{A}_{210}=0$. The magnitude of the fundamental signal from bridge 28 is $\vec{A}_{31}=\vec{A}$, less than that of the first level fundamental signals as a result of the increase in voltage magnitude provided for the second level signals. Therefore, the voltage difference between corresponding phases $A_1$, $A_2$, and $A_3$ is:

$$\vec{A} \cdot \left(1 - \frac{1}{\cos 20°}\right) = 0.064 \cdot \vec{A},$$

shown by the difference vector 110. The voltage developed across the windings 90, 93 is $$(-0.064 \cdot \vec{A}) \cdot \frac{N_S}{N_S + N_P},$$

or $-0.022 \cdot \vec{A}$, resulting in signal voltage magnitudes $\vec{A}_{110}=1.042 \cdot \vec{A}$, $\vec{A}_{210}=1.042 \cdot \vec{A}$ on lines 100, 103 of the transformer output lines 100-108. The voltage developed in winding 97 is $$(-0.064 \cdot \vec{A}) \cdot \left( \frac{N_P}{N_S + N_P} \right) = +0.042\vec{A},$$

which is summed with signal $\vec{A}_{31}$ to provide an output signal voltage magnitude of $1.042 \cdot \vec{A}$ on the line 106. As a result the fundamental signals for the phase outputs A, B, C have equal magnitudes of $1.042\vec{A}$ at the output of the transformer 32. The sum of the three fundamental current signals for each of the three sets of corresponding phase outputs is $I_T = (2 \cos 20° + 1) \cdot I = 2.8794 \cdot I$. The output $K\omega$ power of the converter in each phase of the output transformer 29 is $P_o = 1.042 \text{ V} \cdot 2.8794 \cdot I = 3.0 \text{ V} \cdot I$, or three times the output $K\omega$ power of an individual bridge, as in a converter without harmonic cancellation.

The harmonic signals are similarly added to the difference harmonic voltages developed across each of the associated windings. The 5, 7, 11 and 13th harmonics of the first level fundamental signals are each at a magnitude 0.5321 times the magnitude of the same order harmonic at the phase output of the bridge 28, and each are 180° out of phase with the same order harmonic of the corresponding phase output fundamental signals of the bridge 28. Although the operation of the transformer 31 was described in terms of the A corresponding phases centered about the nondisplaced $A_3$ output at 0; such that the $A_3$ harmonics all be at the same 0° phase angle, the harmonics of the $B_3$ and $C_3$ phases, with fundamentals at 240° and 120° respectively, are alternately phased at 240° and 120°. As a result the phase angles of the 5, 7, 11 and 13th harmonics of these phases are: $B_{35}(120°)$, $B_{37}(240°)$, $B_{311}(120°)$, $B_{313}(240°)$ and $C_{35}(240°)$, $C_{37}(120°)$, $C_{311}(240°)$, $C_{313}(120°)$. The first level fundamentals $B_{110}$, $B_{210}$ each have a phase angle of 240° corresponding to $B_{35}$ and each have 5, 7, 11 and 13th harmonics with identical phase angles of $+60°$, 180° out of phase with the harmonics $C_{35}$, $B_{37}$, $C_{311}$ and $B_{313}$. Similarly the 5, 7, 11 and 13th harmonics of the first level fundamentals $C_{110}$, $C_{210}$ are each at a phase angle of 300°, 180° out of phase with the harmonics $B_{35}$, $C_{37}$, $B_{311}$, and $C_{313}$.

FIG. 7B illustrates the fundamental signal 5th harmonic $\vec{A}_{35}$ at 0° and the first level fundamental signals 5th harmonics $\vec{A}_{150}$, $\vec{A}_{250}$ at 180°. Since the harmonics $\vec{A}_{150} = \vec{A}_{250} = (N_S/N_P) \cdot \vec{A}_{35}$, the 5th harmonic difference voltage in the leg 36 is $$\vec{A}_{35} - \left( -\vec{A}_{35} \cdot \frac{N_S}{N_P} \right) = \vec{A}_{35} \left( \frac{N_P + N_S}{N_P} \right),$$

illustrated by the difference vector 112. As a result the voltage developed in windings 90, 93 is $$-A_{35} \left( \frac{N_P + N_S}{N_P} \right) \cdot \left( \frac{N_S}{N_P + N_S} \right) = -A_{35} \cdot \frac{N_S}{N_P}$$

which when summed with the second level fundamental 5th harmonics on lines 60, 63 results in zero 5th harmonic signal components on lines 100, 103. Similarly, the sum of the 5th harmonic $\vec{A}_{35}$ on the line 86 with the voltage developed across the winding 97 results in $$\vec{A}_{35} - \vec{A}_{35} \left( \frac{N_P + N_S}{N_P} \right) \cdot \left( \frac{N_P}{N_P + N_S} \right) = 0,$$

to produce a zero 5th harmonic on the line 106. Each of the remaining second level fundamental signal harmonics 7, 11 and 13th are treated in an identical manner for each of the remaining corresponding phases, such that the 5, 7, 11 and 13th harmonics and those higher order harmonics which are in phase with those cancelled $$\left( 2PN \cdot \frac{360}{2PN} \right)$$

or 6 N orders higher (23, 25, 29, 31) are cancelled in the output signals on the lines 100–108. Each output signal has as a first harmonic the 17th $(6 \cdot N - 1)$, and each are presented to the output transformer 29 which provides the parallel summation of the corresponding phase angle signals to produce the output fundamental signal in each of the three output phases of the converter.

The harmonic cancellation scheme disclosed for the three bridge converter may be extended to provide higher order harmonic cancellation in converters having a higher non-power two N number of bridges, each added bridge allowing cancellation of an additional pair of harmonics up to the $6 \cdot N - 1$ order. In each N bridge converter, the phase angle of the fundamental signals from some or all of the bridges are adjusted to provide for the relative 60/N degree displacement between the fundamental signals of each bridge with at least one other bridge. Preferably the highest even number of the N bridges are phase displaced symmetrically, half positively and half negatively, about a nondisplaced odd number bridge if one is present or if no odd bridge is present, then around the phase angle of the particular corresponding phase output. The highest power of two of the N number of bridges present are designated as a first group and all the remaining bridges are designated as a second group. Preferably, the first group includes those with the furthest displaced fundamental signals and the second group includes the bridges having the minimum, or zero phase displacement. The phase displaced fundamental signals of corresponding phase outputs in the first group are connected in pairs through phase shifting transformers which provide for the addition of each displaced fundamental signal magnitude with the sum difference signal magnitude between it and the displaced fundamental signals at corresponding phase outputs of the other first group bridges and with the sum difference signal magnitude between the displaced fundamental signals of at least one other set of corresponding phase outputs in the first group, to provide for each displaced fundamental signal a first group fundamental signal having a phase angle corresponding to one of the three converter phases. Depending on the number of bridges present, the addition of the displaced fundamental signals may be provided in levels, each successive level adding the difference signal magnitudes between increasingly higher numbers of pairs of displaced corresponding phase fundamentals in the group. In effect a first level fundamental signal is provided for each pair of fundamental signals, a second level fundamental signal for each pair of first level fundamental signals and so on. Each higher level adds, to each displaced fundamental, the signal differences between an increasing power of two number of pairs of corresponding phase fundamental signals. The highest order harmonic which is phase shifted by the addition similarly increases up to a first harmonic of order 6·N−1.

If there is more than one bridge in the second group then the displaced fundamental signals of corresponding phase outputs are similarly connected in pairs to phase shifting transformers. If there is only a single bridge, then its fundamental signals represent the second group fundamental signals. As in the first group, the transformers add each second group displaced fundamental signal with the sum difference signal magnitude between it and the displaced fundamental signals at corresponding phase outputs of the other second group bridges and with the sum difference signal magnitude between the displaced fundamental signals of at least one other set of corresponding phase outputs of the second group, to provide for each a second group fundamental signal having a phase angle corresponding to one of the three converter phases and having all signal harmonics of an order less than (6·N−1) at respective phase angles which are one hundred eighty degrees out of phase with equal order harmonics of the first group fundamental signals having the same phase angle. Summation of the first and second group fundamental signals results in cancellation of the harmonics of an order less than 6·N−1.

Figure 8:
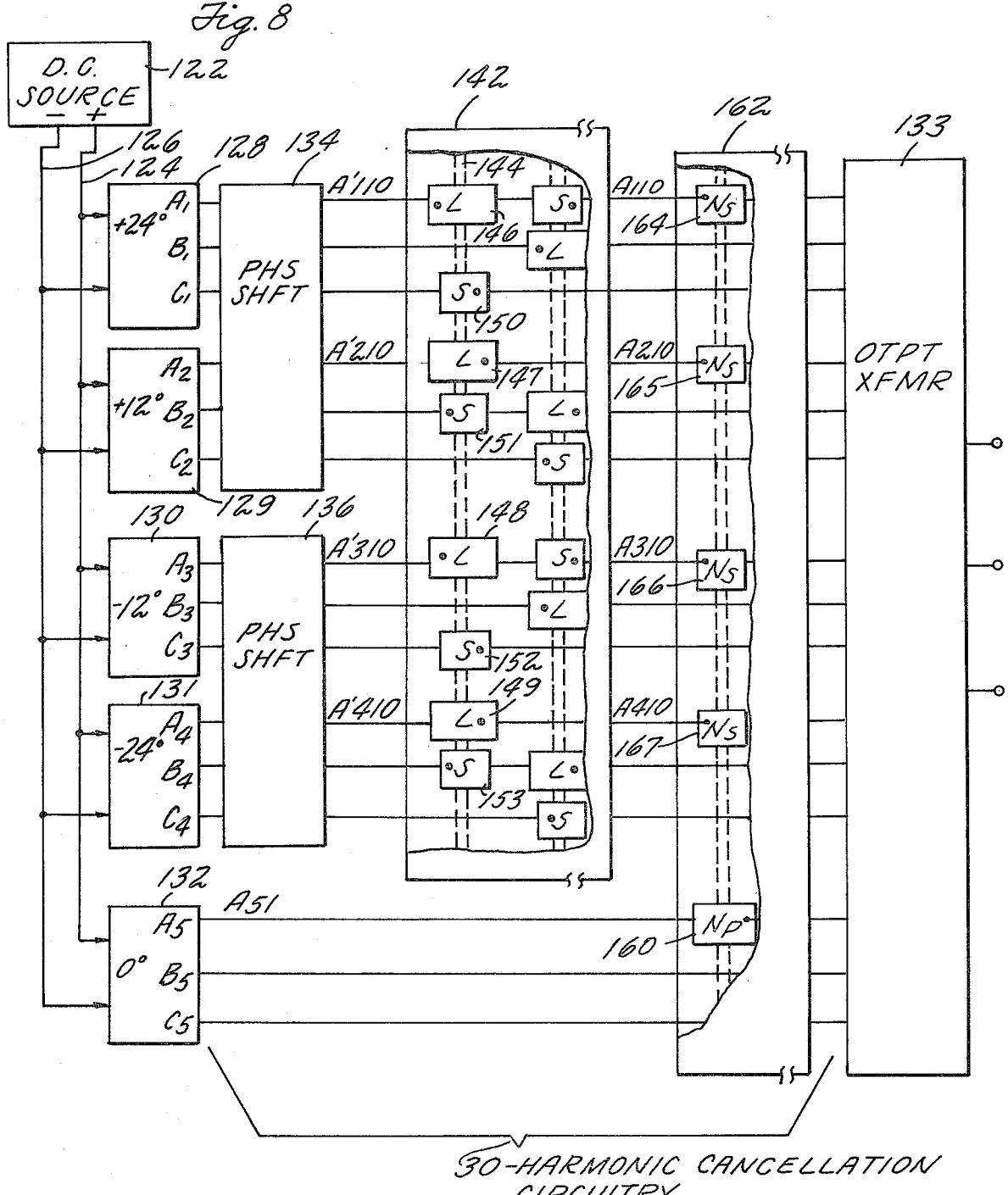
FIG. 8 is a schematic block diagram of an embodiment of the harmonic cancellation of the present invention for use with a three-phase, five-bridge converter.

Referring to FIG. 8, in an embodiment of the harmonic cancellation of the present invention for a five bridge (N=5) three phase converter 120 having a DC source 122 connected through lines 124, 126 to the inputs of five bridges 128-132, each bridge providing phased fundamental signals to an output transformer 133 which provides a sum fundamental signal for each phase of the three corresponding phase outputs, harmonic cancellation circuitry is added between the bridges and the transformer 133. An interpole phase angle of 12° (60/5) is provided by phase displacing the highest even number bridges 128-131 symmetrically about the nondisplaced odd bridge 132. As a result the five bridges are phase displaced by ±24°, ±12° and 0°, as illustrated by the fundamental signals of each in FIGS. 9A-9E. The bridges highest power of two number of bridges, designated as a first group, are connected in available pairs, each pair preferably including those having the most closely related power factors (bridges 128, 129 and 130, 131) to phase shifting transformers 134, 136, each identical to transformer 31 of FIG. 1. Each transformer provides first level fundamental signals with a magnitude equal to the sum of the related fundamental signal from the bridge pair with the difference fundamental voltage magnitude of two sets of displaced fundamentals of corresponding phase outputs developed across series L and S windings as described with respect to the transformer 31 of FIG. 1. The five bridge configuration requires two level addition, the first level rotates and aligns the harmonics up to the 13th at a phase angle 180° from the mean displacement angle of the two corresponding pole outputs of the bridge pair. FIG. 9F illustrates the first level fundamental signals for the pair of bridges 128, 129. The corresponding poles $A_{11}$, $A_{21}$ at +24° and +12°, respectively, are summed with the voltages across the series L and S windings of the transformer 134 to provide the first level fundamental signals $A'_{110}$, $A'_{210}$ at the mean phase displacement angle of +18°. All harmonics up to 13 are rotated 180° from the first level fundamental to a phase angle 198° as illustrated by a dashed vector 138. Vectors 139, 140 illustrate the axis of the phase rotated harmonics for the B and C corresponding phase outputs.

The first level fundamental signals from the transformers 134, 136 are presented to a second level phase shift transformer 142 having a three-phase core with X, Y and Z legs identical to phase shifting transformers 134, 136 and 31 of FIG. 1, with the exception that each of the transformer 142 legs includes a set of eight windings. Each set on each leg includes four L and four S windings electrically connected in series opposing with an opposite type winding on one of the remaining two legs, as in the transformer 31 of FIG. 1. The leg 144 of the transformer 142 is illustrated in partial cutaway and includes L windings 146-149 and S windings 150-153 connected in subsets of four windings, including two L and two S windings, to selected outputs of the transformers 134, 136 in an identical manner to the four windings on each leg of the transformer 31 (FIG. 1). The turns ratio (S/L) of the transformer 142 is equal to 0.4618 for the 18° phase displacement angle between the first level signal and the 0° phase angle of the nondisplaced corresponding phase output as manifested by the $A_5$ output of the nondisplaced bridge 132. The turns ratio of each of the phase shifting transformers 134, 136 is equal to 0.129 for the 6° phase displacement angle between the first level fundamental signals (±18°) and the fundamentals of the bridge pairs (±12, ±24). The turns ratio of each is determined from the equation:

$$\frac{S}{L} = \frac{1}{\text{SIN } 30°\left[\frac{\text{SIN } \phi}{\tan 30\left(\frac{1 - \text{Cos}^2\phi}{\text{Cos } \phi}\right)} - 1\right]};$$

where $\phi$ is the phase displacement angle.

In the transformer 142 the first level signals from transformers 134, 136 are summed with voltages developed in the series L and S windings to provide second level fundamental signals at the output of the transformer. FIG. 9G illustrates the first level fundamental signals for the $A_1$-$A_4$ corresponding pole outputs of bridges 128-131, the pair $A'_{110}$, $A'_{210}$ displaced at +18° and the pair $A'_{310}$, $A'_{410}$ at 342° (−18°), symmetrically about the zero degree phase angle of the $A_5$ pole output of the nondisplaced bridge 132. Each first level signal has a power factor cos 18°. The second level fundamental signals ($A_{110}$-$A_{410}$) have a zero degree phase angle with a voltage magnitude 1/Cos 18° times greater than that of the related first level signals. In addition the transformer 142 rotates all harmonics of an order less than (6·N−1) to a phase angle displaced by 180° from that of the second level fundamental signal, as illustrated by the vector 160. Each harmonic is at a magnitude 0.264 (S/L) times that of the same order harmonic of the corresponding pole fundamental signal of the nondisplaced bridge 132.

The second level signals from the transformer 142 and the fundamental signals from the nondisplaced bridge 132 are presented to a three-phase cancellation transformer 162 having three core legs, each leg having a set of five windings disposed thereon including four secondary windings ($N_S$) and one primary winding ($N_P$). The transformer is identical to the cancellation transformer 32 of FIG. 1 with the exception of the added two secondary windings in each leg. The second level fundamental signals of corresponding phases are connected through secondary windings ($N_S$) of the same set. The nondisplaced fundamental signals of bridge 132 are each connected through a primary ($N_P$) winding on the same leg with the corresponding phase second level signals. The cutaway of transformer 162 illustrates the connections for the A corresponding pole outputs. The second level signals $A_{110}$–$A_{410}$ are connected through $N_S$ windings 164-167 and the fundamental signal $A_{51}$ is connected through $N_P$ winding 168. The turns ratio ($N_S/N_P$) is again determined to provide zero fundamental ampere turns in the core, and for the transformer 162 the ratio is equal to 0.264.

The second level fundamental signals and the fundamental signals from the bridge 132 are summed in an identical manner to that described for the three-bridge configuration of FIG. 1, to provide resultant output fundamental signals from the transformer 162 at a magnitude 1.045 times that of the voltage magnitude of the fundamental signal at the bridge pole outputs. The total current provided by the resultant fundamental signals of each five corresponding phase outputs is equal to $I_T = I + 2 \cdot I \cdot \cos 12° + 2 \cdot I \cdot \cos 24° = 4.783 \cdot I$, and the inverter power output in each phase is equal to 5VI.

The transformer 162 provides harmonic cancellation in an identical manner to the trasformer 32, for all harmonics up to the $6 \cdot N - 1$), or the 29th harmonic, each second level signal harmonic being 180° out of phase with the same order harmonic from the corresponding pole outputs of the nondisplaced bridge. As a result, the 5, 7, 11, 13, 17, 19, 23, and 25th harmonics plus those higher order (6 N) harmonics 35, 37, 41, 43, 47, 49, 53 and 55 are cancelled from the sum fundamental signal provided by transformer 133 to the load, and the first harmonic of the sum fundamental signal is the 29th.

The harmonic cancellation of the present invention provides harmonic signal cancellation for other than power of two numbers of inverter bridges to allow the most cost efficient inverter configuration. Similarly, although the invention has been shown and described with respect to illustrated embodiments thereof, it should be understood by those skilled in the art that the foregoing and various other changes, omissions, and additions in the form and detail thereof may be made therein without departing from the spirit and the scope of the invention.

Having thus described typical embodiments of my invention, that which I claim as new and desire to secure by Letters Patent is:

1. A method of cancelling the signal harmonics of the output fundamental signals of a three-phase converter, each output fundamental signal provided as the sum of equal phase angle fundamental signals from one of three sets of corresponding phase outputs of an N number of converter bridges, where N is a non-power of two, comprising the steps of:

adjusting the phase angle of the fundamental signals to provide a phase displacement of the fundamental signals of each bridge by 60/N degrees relative to the fundamental signals provided at corresponding phase outputs of at least one other bridge;

grouping the highest power of two number of bridges in a first group and all the remaining bridges in a second group;

adding to each displaced fundamental signal in said first group and said second group, the difference signal magnitude between the particular fundamental signal and the displaced fundamental signals from corresponding phase outputs in the related one of said groups and the difference signal magitude between displaced fundamental signals of at least one other set of corresponding phase outputs of the related ones of said groups, to provide a first group fundamental signal for each displaced fundamental signal in said first group and a second group fundamental signal for each displaced fundamental signal in said second group, each having a phase angle corresponding to one of the converter phases, said second group fundamental signals having all signal harmonics of an order less than $6 \cdot N - 1$ displaced by one hundred eighty degrees from the equal order signal harmonics of said first group fundamental signals of equal phase angle; and summing said first group fundamental signals with said second group fundamental signals having equal phase angle to provide a sum fundamental signal for each set of corresponding phase outputs from the N bridges, each sum fundamental signal representative of the output fundamental signal in one phase of the three-phase converter, each having a first harmonic of order $(6 \cdot N - 1)$.

2. The method of claim 1, wherein the step of adjusting includes:

displacing the corresponding phase outputs of the N bridges such that even numbers are displaced positively and negatively from the associated one of the converter output phases, each relatively displaced by 60/N degrees from adjacently displaced corresponding phase outputs, to provide pairs of symmetrically displaced corresponding phase outputs extending from an innermost pair at a minimum phase displacement to an outermost pair at a maximum displacement.

3. The method of claim 2, wherein the step of grouping includes:

selecting for said first group those bridges, up to the highest power of two, which provide displaced corresponding phase outputs extending from the outermost pair to the innermost pair, said second group including the remaining bridges having corresponding phase outputs at the minimum displacement.

4. In a three-phase converter having a non-power of two (N) number of converter bridges, each having phase outputs for providing fundamental signals in each of three converter phases displaced in a closed sequence by one hundred twenty degrees, each phase output providing the associated fundamental signal at a phase angle determined by a phased gate signal provided from a gate signal source, the sum of equal phase angle fundamental signals from corresponding phase outputs being representative of the output fundamental signal in each converter phase, the improvement comprising:

means for adjusting the phased gate signals to provide phase displacement of the fundamental signals of each bridge by 60/N degrees relative to the fundamental signals provided at corresponding phase outputs of at least one other bridge;

first transformer means, responsive to the displaced fundamental signals from a first group including the highest power of two number of bridges, for adding each displaced fundamental signal magnitude with the sum difference signal magnitude between it and the displaced fundamental signals at corresponding phase outputs of the other first group bridges and with the sum difference signal magnitude between the displaced fundamental signals of at least one other set of corresponding phase outputs in said first group, to provide for each displaced fundamental signal a first group fundamental signal having a phase angle corresponding to one of the three converter phases;

second transformer means responsive to the displaced fundamental signals from a second group comprising all of the bridges other than those included in said first group, for adding each second group displaced fundamental signal with the sum difference signal magnitude between it and the displaced fundamental signals at corresponding phase outputs of the other second group bridges and with the sum difference signal magnitude between the displaced fundamental signals of at least one other set of corresponding phase outputs of said second group, to provide for each a second group fundamental signal having a phase angle corresponding to one of the three converter phases and having all signal harmonics of an order less than $(6 \cdot N - 1)$ at respective phase angles which are one hundred eighty degrees out of phase with equal order harmonics of said first group fundamental signals of equal phase angle; and summing transformer means, responsive to said first group fundamental signals and to said second group fundamental signals for summing said first group and said second group fundamental signals of equal phase angle to provide the output fundamental signal in each of the three converter phases, each output fundamental signal having a first harmonic of order $(6 \cdot N - 1)$.

* * * * *

UNITED STATES PATENT AND TRADEMARK OFFICE
CERTIFICATE OF CORRECTION

PATENT NO. : 4,204,264
DATED : May 20, 1980
INVENTOR(S) : Kenneth Lipman

It is certified that error appears in the above-identified patent and that said Letters Patent are hereby corrected as shown below:

Column 1, line 46 "holes" should be --poles--.

Column 9, line 10 "$[\cos(180° - \phi_{17})+$" should be --$[\cos(180° - \phi_{17})-$--.

Column 15, line 27 "trasformer" should be --transformer--.

Column 15, line 28 "6·N-1)" should be --(6·N-1)--.

Signed and Sealed this

Eleventh Day of November 1980

[SEAL]

Attest:

SIDNEY A. DIAMOND

Attesting Officer

Commissioner of Patents and Trademarks